US012604885B2

(12) United States Patent　　　　　(10) Patent No.:　US 12,604,885 B2
Buurma et al.　　　　　　　　　　　　(45) Date of Patent:　　Apr. 21, 2026

(54) ANIMAL SHEPHERDING USING A NON-LETHAL ACTIVE DENIAL SYSTEM OF DIRECTED ELECTROMAGNETIC ENERGY

(71) Applicant: Battelle Memorial Institute, Columbus, OH (US)

(72) Inventors: Chris Buurma, Columbus, OH (US); Lindy Dejarme, Columbus, OH (US); James E. Risser, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 259 days.

(21) Appl. No.: 18/560,294

(22) PCT Filed: May 11, 2022

(86) PCT No.: PCT/US2022/028796
§ 371 (c)(1),
(2) Date: Nov. 10, 2023

(87) PCT Pub. No.: WO2022/241005
PCT Pub. Date: Nov. 17, 2022

(65) Prior Publication Data
US 2024/0268368 A1　　Aug. 15, 2024

Related U.S. Application Data

(60) Provisional application No. 63/187,198, filed on May 11, 2021.

(51) Int. Cl.
A01M 29/26　　　(2011.01)
H05B 6/68　　　(2006.01)
H05B 6/80　　　(2006.01)

(52) U.S. Cl.
CPC ............. A01M 29/26 (2013.01); H05B 6/686 (2013.01); H05B 6/80 (2013.01)

(58) Field of Classification Search
CPC ...... A01M 29/26; A01M 29/24; A01M 29/14; H05B 6/686; H05B 6/80; H05B 6/62; G06Q 50/02
See application file for complete search history.

(56) References Cited

U.S. PATENT DOCUMENTS 6,250,255 B1 *　6/2001　Lenhardt ............... A01M 29/16
　　　　　　　　　　　　　　　　　　119/713
7,126,477 B2 *　10/2006　Gallivan ............. F41H 13/0068
　　　　　　　　　　　　　　　　　　340/567

(Continued)

FOREIGN PATENT DOCUMENTS

WO　　　2001/89295 A2　　11/2001
WO　　WO-2022241005 A1 *　11/2022　............ A01M 29/14

*Primary Examiner* — Daniel Pihulic
(74) *Attorney, Agent, or Firm* — VOLPE KOENIG

(57) ABSTRACT

A non-lethal animal shepherding active denial system of directed electromagnetic energy having at least one emitter to provide low-energy radiation to deter and shepherd birds and other species away from dangerous areas such as airports or wind turbines. The directed electromagnetic energy may be emitted in a conical shape to target a precise area and to define at least one denial zone and at least one shepherding zone. The shepherding zone may create a pathway to shepherd animals away from the denial zone to allow the birds to safely escape from the denial zone. Objects within a shepherding zone are subjected to dielectric heating, such that the radiation penetration is very shallow, only heating the surface of the skin or fur. By employing a large spatial swath, lower energies (<1 kW), and time-varying intensity, birds and other species can be shepherded away from regions of interest.

20 Claims, 5 Drawing Sheets

(56) References Cited

U.S. PATENT DOCUMENTS

| | | | |
|---|---|---|---|
| 2005/0156743 A1* | 7/2005 | Gallivan | F41H 13/0068 |
| | | | 340/541 |
| 2008/0210175 A1* | 9/2008 | Bryce | A01M 31/002 |
| | | | 342/29 |
| 2014/0185414 A1 | 7/2014 | Husseiny et al. | |
| 2020/0160831 A1 | 5/2020 | Newton | |
| 2024/0268368 A1* | 8/2024 | Buurma | H05B 6/62 |

* cited by examiner

ANIMAL SHEPHERDING USING A NON-LETHAL ACTIVE DENIAL SYSTEM OF DIRECTED ELECTROMAGNETIC ENERGY

FIELD OF INVENTION

The active denial system relates to a system for animal shepherding, and more specifically to a non-lethal animal shepherding active denial system of directed electromagnetic energy.

BACKGROUND

Avian species are known to pose hazards to commercial aviation, particularly at airports. The collision of birds and aircrafts during flight operation causes problems including bird fatalities and serious damage to aircrafts. In some situations, this damage can result in emergency landings or even plane crashes. Typically, ultrasonic and infrasonic directed energy systems are used to deter birds from a designated area around a runway to prevent collisions. In addition, drone-based avian denial systems may also provide deterrence against complications due to avian interference.

Current ultrasonic and infrasonic systems, which disperse animals in an uncontrolled fashion, require the use of abrupt noises which can startle and shock birds, posing dangers to avian species and resulting in hazardous conditions for commercial aviation when the birds become frightened. Likewise, drone-based avian denial systems are expensive to operate, highly complex and also pose collision risk with planes. Accordingly, it would be advantageous to utilize a safer and more precise approach to deterring and managing avian behavior in areas of high traffic, such as commercial airports, public spaces, parks, and roadways. Such a system for managing avian behavior may also provide a broad array of additional applications including herding land animals, aquatic species, and insect shepherding with respect to pest control.

SUMMARY

There is provided according to the embodiments of the disclosure a system for animal shepherding utilizing directed non-lethal, focused electromagnetic radiation. This focused radiation creates a denial zone and a shepherding zone. The shepherding zone may create a pathway to shepherd animals away from a targeted area.

A system for performing animal shepherding is disclosed. The system comprises a signal generator in communication with a power source, an amplifier operatively coupled to the power source and configured to receive a source of electromagnetic energy from the power source, and at least one emitter with beam shaping capability operatively coupled to the amplifier and configured to direct the source of electromagnetic energy in a predetermined shape to at least one first zone in a targeted area, the at least one first zone disposed adjacent to a second zone in the targeted area. The electromagnetic energy causes a heating of an object disposed in at least one zone, and the electromagnetic energy does not cause the heating of the object disposed in at least one other zone.

Based upon the disclosed system for performing animal shepherding, it is possible to shepherd animals with non-lethal, focused electromagnetic radiation that may be emitted conically. The radiation may be long ranged, reaching distances with sufficient heating to deter a bird greater than two-hundred meters. Variable elevation zones for the directed electromagnetic energy may allow animals to be shepherded along directed paths, and adjustable pulse duration may prevent interference with electrical equipment or humans within a targeted area, such as an airport runway.

In an embodiment, the disclosed system for performing animal shepherding may be adapted for additional applications including insect and pest control.

These and other objects, features and advantages of the disclosure will be apparent from the following detailed description of illustrative embodiments thereof, which is to be read in connection with the accompanying drawings.

BRIEF DESCRIPTION OF THE DRAWING

A more detailed understanding may be had from the following description, given by way of example in conjunction with the accompanying drawings, wherein like reference numerals in the figures indicate like elements, and wherein.

Figure 1:
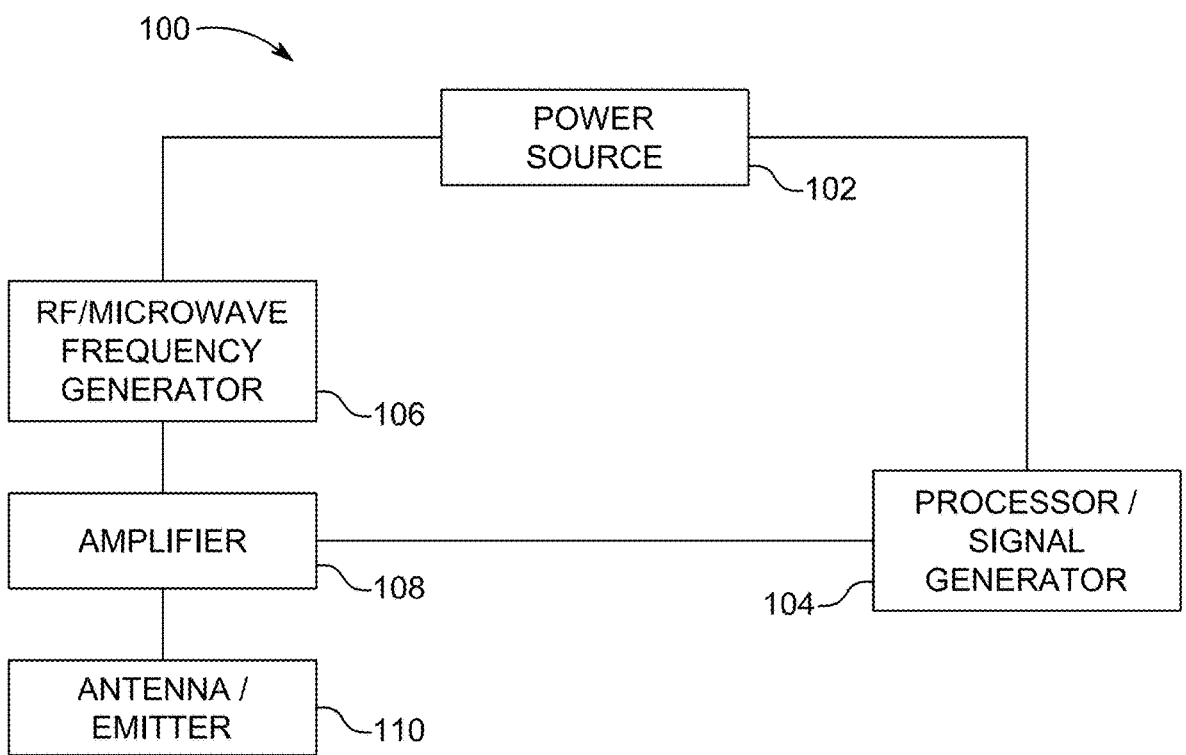
FIG. 1 is a block diagram of an example system for animal shepherding which is used in conjunction with one or more disclosed embodiments.

The features and advantages of the inventive concepts disclosed herein will become apparent from the detailed description set forth below when read together with the figures.

DETAILED DESCRIPTION

Various embodiments are described in the following paragraphs. Where like elements have been depicted in multiple embodiments, identical or similar reference numerals have been used for ease of understanding.

The non-lethal active denial system discussed herein utilizes directed electromagnetic energy to provide for animal shepherding. In general, active denial systems may provide a non-lethal energy approach to crowd control, convoy protection, or perimeter security and a method of deterring individuals from entering a designated area or denial zone with minimal risk of injury. An operating concept may be to deter avian species from entering a targeted area, such as an airport runway, through rapid tunable dielectric heating of the species within an affected area. A targeted area may also be other infrastructure, such as a wind turbine, government building, a military campus, or a wildlife control area of a national park, for example.

In addition to the human shepherding and security applications of active denial systems, further applications may include herding land animals, such as deer or bears, as well as herding aquatic species by changing the wavelength of the emitted energy.

Prior art active denial systems may utilize ultrasonic and infrasonic directed energy to produce inaudible sound waves that may deter and repel humans or animal species, such as birds and insects, from entering a targeted area. For example, the ultrasonic and infrasonic directed energy signals may interfere with birds' acoustic navigational systems, mimicking atmospheric changes that cause birds to avoid unstable weather conditions, particularly for species located near oceans. This directed energy also acts to trigger a predator detection or danger response with high pulse rates. In general, active denial systems based on sonic shepherding are often undirected and pose problems due to sound wave propagation and the response time of a species predator-fear response.

Active denial systems may also use beams of electromagnetic radiation that heat a target's skin through dielectric heating. The use of heat instead of sound reduces the risk of erratic avian behavior in areas of commercial aviation, resulting in safer flying conditions for passengers and pilots, and less bird fatalities. Heat may be increased gradually in areas from no discomfort to mild, to mildly painful, making deterrence more humane.

The non-lethal active denial system discussed herein utilizes electromagnetic radiation to create a heating sensation on a target's skin by employing a frequency of radiation low enough such that only a very shallow depth into the skin is subjected to dielectric heating. The following equation describes the radiative dielectric heating of a spherical object in air, as a reasonable approximation for a bird in flight. The equation accounts for the following assumption:

The bird is flying through the air so that its skin is constantly being cooled by the air.

The bird's radio frequency ("RF") properties match that of water.

$$\Delta T(t) = \frac{4\pi v \epsilon''_r r}{3hc} I_{avg}\left(1 - \exp\left(-\frac{3h}{rc_p}t\right)\right) \qquad \text{Equation 1}$$

In which, v is the frequency of radiation (1 GHz to 60 GHz is appropriate for the animal shepherding application).

$\epsilon''_r$ is the imaginary component of the complex dielectric function expressed as a function of frequency. This can be thought of as an absorption coefficient, or rather, it is how this particular material interacts with light at long frequencies which cause them to absorb energy.

r is the effective radius of the bird as approximated by a sphere.

h is thermal heat transfer coefficient. (In this case, the cooling rate due to freely flowing air in contact with skin, 300 W/m²/K).

$I_{avg}$ is the average intensity of the beam over time.

$c_p$ is the volumetric specific heat of water ($4.1796 \times 10^6$ J/K/m³).

t is time.

In an embodiment, the animal shepherding system may employ at least 50 GHz focused electromagnetic radiation. At this frequency the radiation penetration depth is approximately 400 μm, such that the radiation penetration is very shallow, only heating the surface of the skin or fur. Such electromagnetic radiation does not interfere with aircraft operations or affect human personnel in the targeted area of a denial zone. This heating sensation causes discomfort to deter and repel the target from entering the denial zone.

The animal shepherding system may comprise an active denial system that may include one or more electromagnetic radiation emitters or antennae that may be powered by a power source and amplifier. An emitter may be an antenna, such as a conical antenna or helical antenna. An electromagnetic radiation emitter may be utilized to produce a non-lethal, non-contact, long-ranged animal shepherding active denial system. The emitter may determine an effective range, spatial swath, duration and energy level of the emission of electromagnetic radiation. For example, the range of the effective electromagnetic radiation emitter may be at least two-hundred meters, and the energy level of the electromagnetic radiation emission may be less than 1 kW. The electromagnetic radiation emitter may provide a time-varying intensity for the pulse.

The active denial system may utilize the emitters for spatial controlling of electromagnetic radiation emissions. Many active denial systems emit energy isotopically and radially in a spherical shape. However, as will be described in further detail, the emitters of the embodiments described herein may emit energy signals in a conical shape, for example, to achieve a more precise localization of the directed energy.

In general, an emitter may provide for the spatial control of the electromagnetic radiation in a targeted area by creating a heating zone. In particular, a heating zone may comprise distinct deterring zones and denial zones relative to a shepherding zone for departing from the deterring and denial zones.

The spatial control and size of a deterring zone and a denial zone may be related, in part, to an output power per unit time of the power source coupled to the emitter. For example, depending on the power source, stronger emitters may provide for wider deterring zones and denial zones. The level of power supplied to an emitter may be associated with shepherding birds from a given distance, so that the required power levels for herding a particular animal from a given distance may be evaluated.

The spatial control of emitted electromagnetic energy relative to the size of a deterring zone and a denial zone may also be based, in part, on the type of emitters or directional antennae that are coupled to the power source. An emitter and an antenna are the same. An emitter may be an antenna, such as a conical antenna or helical antenna that may transmit or emit microwave frequency including a range of 50 GHz. As understood by those of skill in the art, an emitter may direct electromagnetic energy in a conical shape, while a directional antenna, such as a helical antenna, may produce electromagnetic energy along the axis of the helix antenna in a particular direction. Depending on the desired spatial control of the emission of electromagnetic radiation, the animal shepherding system may utilize one or both of a conical emitter and directional antenna to provide defined deterring zones and denial zones relative to a shepherding zone for herding animals within a targeted region.

In an embodiment, emitters may direct energy signals in overlapping conical shapes to create at least two zones in a targeted area: a denial zone and a shepherding zone.

A denial zone may be the conically shaped area where electromagnetic energy is emitted. In this area, the electromagnetic energy may provoke a heating sensation in the birds that enter the area, thereby repelling and deterring the birds from entering the area. After attempting to fly in the denial zone, birds may learn or adapt to the denial zone's location and be deterred from entering the area again because of the heating sensation.

A shepherding zone is the area adjacent or between denial zones where no radiative heating is expected, and it may create a pathway for birds to safely escape the denial zone and be shepherded away from the targeted area. The shepherding zone may feature various shapes, such as rectangular shapes, for example. When flying through the targeted area, birds actively avoiding the heat may learn of the pathway through the shepherding zone and may not attempt to fly through the denial zones.

In another embodiment, emitters may direct energy signals in the conical shape to create at least three distinct zones in a targeted area. More specifically, a first zone may comprise a denial zone near the ground to discourage landing, a second zone may comprise a denial zone 10 meters above the ground to discourage fly-throughs, and a third zone between the first and second denial zones to provide a shepherding zone to allow departure from either of the first and second denial zones.

An emitter may be placed on a light pole, the side of a building, or the ground surface, for example. If more than one emitter is used in the non-lethal animal shepherding active denial system, the combination of denial zones produced by the emitters may create a shepherding zone.

In an embodiment, the elevation of the shepherding zones may be determined by the respective positioning, angle, and focal length of the radiation emitters of the active denial system. For example, the emitters may be positioned at a predetermined height on light poles or on a side of a building, so that shepherding zones may be provided at a desired elevation. Similarly, the emitters may also be positioned on or adjacent to the ground, thereby providing a shepherding zone at a lower elevation.

An emitter may always be on or the emitters may be controlled by a human operator or computer processor that turns the emitters on when birds are in the targeted area. Emitters may also be controlled with an autonomous detection system that automatically turns on the emitters when a bird or animal is detected. The emitters may also be controlled by a time-varying intensity, such as activation of the emitters during rush hour on roadways. For example, the duration of the emission of electromagnetic radiation may be longer when a plane is approaching a runway or preparing for take-off. A time-varying intensity of a pulse may also be motion-activated to conserve power. For example, a time-varying intensity of a pulse may be motion-activated by the presence of wildlife on a roadway. A time-varying intensity of a pulse of electromagnetic energy from an emitter may also include sweeping through frequencies ranging from either weaker intensities to stronger intensities of power generated by a power source, or stronger intensities to weaker intensities of power generated by a power source. An emission of the electromagnetic energy by an emitter may be based, in part, upon a time-varying intensity according to the amount of power supplied from the power source for the source of the electromagnetic energy.

In an embodiment, the amount of energy or frequency emitted by a radiation emitter may be changed. For example, a lower frequency, resulting in heating of a deeper skin depth, may be used if the target is an animal larger than a bird, such as a raccoon. High energies may also be provided which deliver greater heat for larger animals.

In another embodiment, waveguides may be used by the emitters to guide the electromagnetic radiation in a chosen direction with minimal loss of energy. For example, the animal shepherding system may comprise waveguides that may be designed to emit waves in a conical shape to create a denial zone. It is to be understood that the system could be configured to have a different shaped denial zone using different waveguides. The waveguides may enable the emitters to spatially control the emission of electromagnetic radiation.

In another embodiment, the animal shepherding system may comprise a virtual wall or vertical fence to provide a safe perimeter zone at an airport, for example, so that animals are discouraged to penetrate the safe perimeter zone of the airport.

Referring to FIG. 1, a block diagram shows an example system for animal shepherding system 100 in which one or more disclosed embodiments can be implemented. The system for animal shepherding 100 may include a processor/signal generator 104, a power source 102, an RF/Microwave Frequency Generator 106, an amplifier 108, and one or more antennae or emitters 110. The processor/signal generator 104 may include a central processing unit (CPU). An emitter and an antenna are the same. An emitter may be an antenna, such as a conical antenna or helical antenna that may transmit or emit microwave signals including a range of 50 GHz. It is understood that the animal shepherding system 100 can include additional components not shown in FIG. 1.

The power source 102 and amplifier 108 may communicate with the processor/signal generator 104, and the power source 102 provides energy to the RF/Microwave Frequency Generator 106. The antennae or emitters 110 emit electromagnetic energy (RF energy), the power of which may be controlled by the power source 102 and amplifier 108 and processor/signal generator 104. This permits the system for animal shepherding 100 to determine and adjust the power levels that are required to herd an animal or bird species at a given distance.

Figure 2:
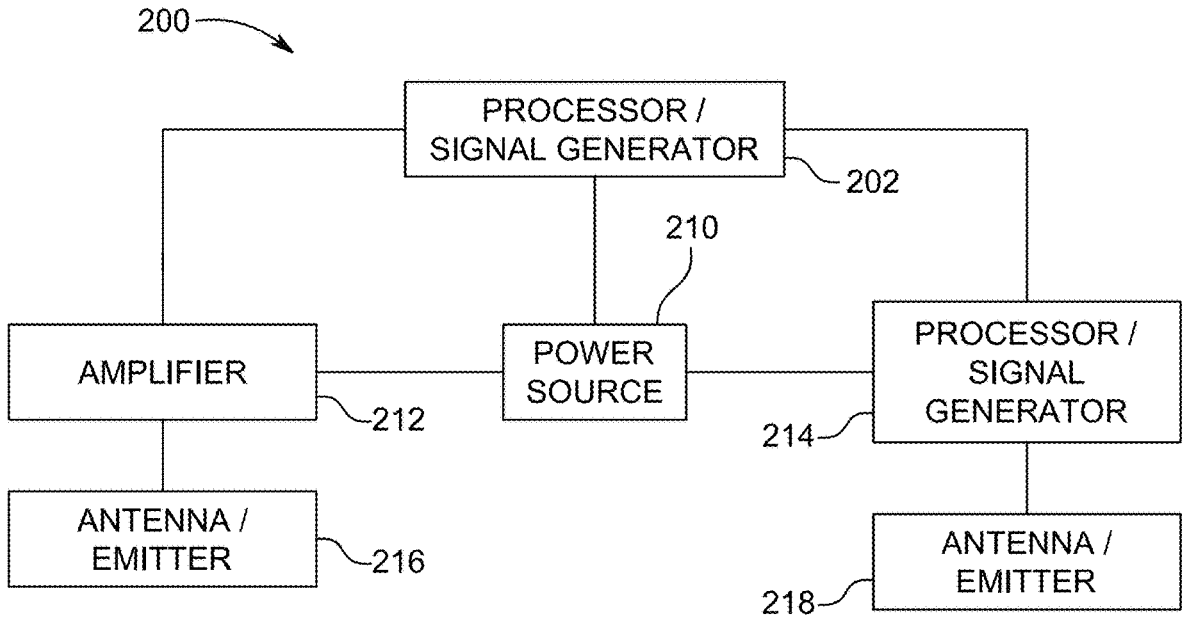
FIG. 2 is an additional block diagram of an example system for animal shepherding which is used in conjunction with one or more disclosed embodiments.

Referring to FIG. 2, an additional block diagram shows another example system for animal shepherding 200 in which one or more disclosed embodiments can be implemented. The animal shepherding system 200 includes a processor/signal generator 202, and a power source 210. The processor/signal generator 202 may include a central processing unit (CPU). The power source 210 may respectively utilize amplifiers 212, 214 to increase the signal strength to the antennae or emitters 216, 218. An emitter and an antenna are the same. An emitter may be an antenna, such as a conical antenna or helical antenna that may transmit or emit microwave signals including a range of 50 GHz. It is understood that the animal shepherding system 200 can include additional components not shown in FIG. 2.

The antennae or emitters 216, 218 emit electromagnetic energy (RF energy), the power of which may be respectively controlled by the amplifiers 212, 214 that receive power from the power source 210. This permits the system for animal shepherding system 200 to determine and adjust the power levels that are required to herd an animal or bird species at a given distance and for spatial control of the electromagnetic energy in a targeted area.

As shown in FIG. 2, the animal shepherding system 200 may include at least two amplifiers 212, 214 to increase the signal strength to the antennae or emitters 216, 218. It is understood that the animal shepherding system 200 may include additional components not shown in FIG. 2. For example, the animal shepherding system 200 may include additional amplifiers and antennae or emitters, in addition to the amplifiers 212, 214 and the antennae or emitters 216, 218, so that the animal shepherding system 200 may include an array of antennae or emitters, with each antenna or emitter respectively coupled to an amplifier. It is understood that the animal shepherding system 200 may include any number of antennae or emitters supported by the power source 210 that may comprise an antenna array or emitter array.

Referring again to FIGS. 1 and 2 showing the exemplary configurations of the animal shepherding system 100, 200, various embodiments may be provided based on the configurations shown by the block diagrams of FIGS. 1 and 2. In general, the configurations of the animal shepherding system 100, 200 may enhance active denial within targeted areas by creating spatial pathways where the RF levels are greatly reduced compared to the main RF beam strength. Such pathways with reduced RF levels may include the shepherding zones adjacent to the main RF beam located in the denial zones of a targeted area.

In particular and referring again to the configurations illustrated by the block diagrams of FIGS. 1 and 2, the power source 102, 210 for producing the RF signal may include RF network analyzers, such as an Agilent Technologies PNA Network analyzer (Model Number N5227A), for example. In addition, and as further illustrated in FIGS. 1 and 2, the amplifiers 108, 212, 214 of the animal shepherding system 100, 200 may be a 30 dBm amplifier, for example, that increases the signal strength that is then fed to the transmit antennae or emitters 110, 216, 218. In an embodiment, the respective power sources 102, 210 in combination with amplifiers 108, 212, 214 may provide for a gain of 40 dB or 60 dB for the animal shepherding system 100, 200.

Referring again to FIGS. 1 and 2, in an embodiment, the transmit antenna 110, 216, 218 may be a TACO 5.8 GHz Helical Antenna model number H2058, which provides 15 dB of gain when operated at 5.75 GHz. As understood by those of skill in the art, the TACO 5.8 GHz Helical Antenna model number H2058 may be highly directional with a drop off of ~12 dB from peak at 30° and ~25 dB drop from peak at 90°. In another embodiment, the transmit antenna 110, 216, 218 may be a conical antenna. In yet another embodiment, the transmit antenna 110, 216, 218 may comprise an antenna array including helical antennae, conical antennae, or both helical and conical antennae.

In general, directional antennae, such as the TACO 5.8 GHz Helical Antenna, can be used to set up areas of high and low RF radiation, which may allow animals to safely cross through shepherding zones of a targeted area such as an airport runway.

In addition to utilizing transmit antenna 110, 216, 218 with higher degrees of directionality to herd animals within targeted areas, the antennae or emitters 110, 216, 218 may also comprise phased arrays that may provide for greater control by the animal shepherding system 100, 200. By altering the phase of the emitted electromagnetic radiation, constructive interference may be used to more precisely define the spatially varying denial and deterrence zones. Such an adaptation may provide for deterrence and shepherding zones in the line of sight from the emitter. For example, a phased array may consist of an array of antennae that is operated so that a signal sweeps a targeted area of an airport runway to move birds away from the runway into a shepherding zone, away from the flight pattern of the landing or take-off of an airplane. In addition, it is understood that a phased array may also be configured based upon the phases of the signals from the antennae, so that if a total interference of the signals is constructive, an amplitude of the signals may increase. A signal strength may be phased in a targeted area, such as an airport runway, to provide for hotter regions in denial zones and cooler regions in shepherding zones to direct the birds safely out of the targeted area.

Figure 3:
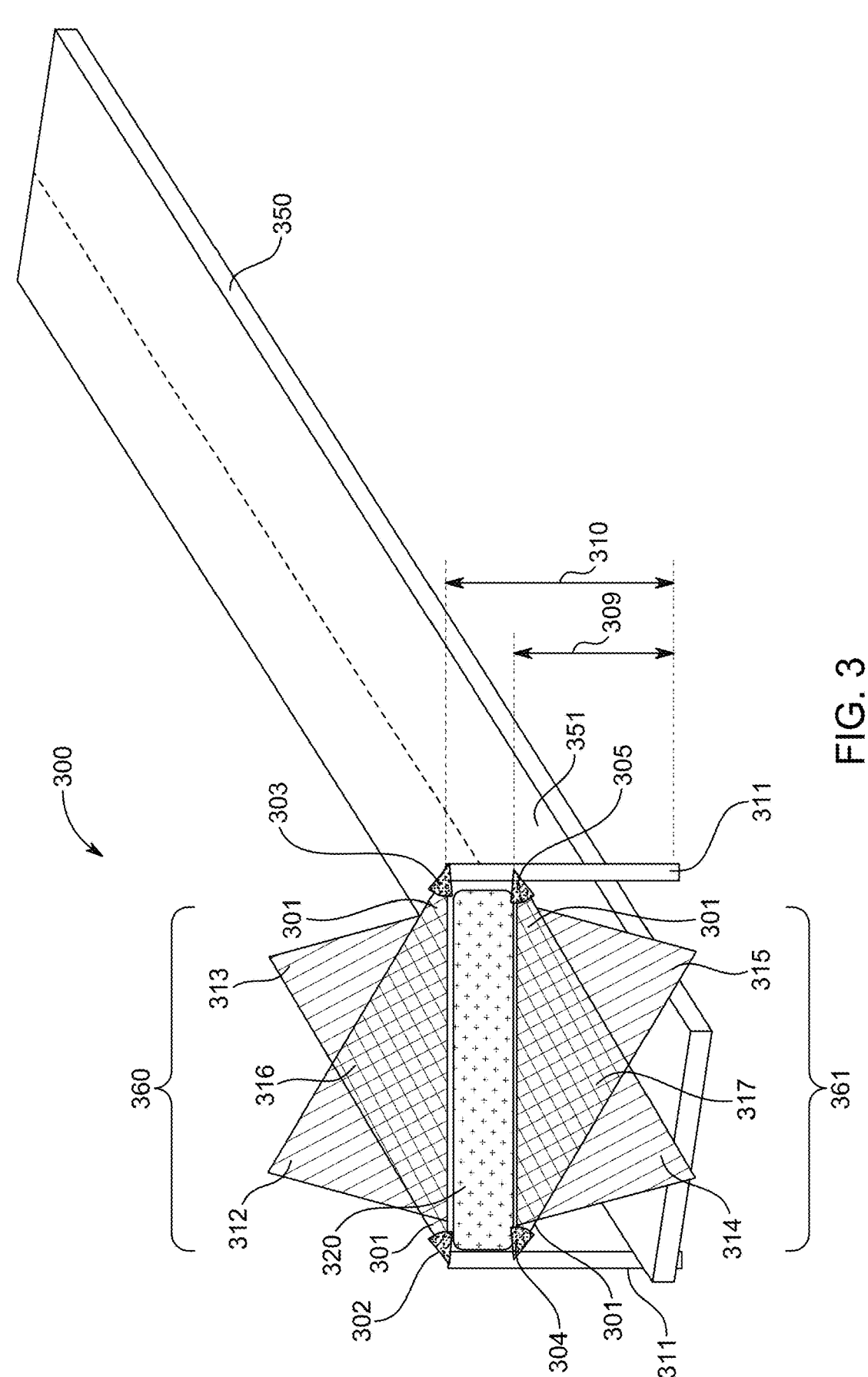
FIG. 3 shows an embodiment of a non-lethal animal shepherding active denial system using directed electromagnetic energy.

FIG. 3 is a diagram of an example embodiment of a non-lethal animal shepherding active denial system 300 using directed electromagnetic energy 301. The system 300 may include four emitters 302, 303, 304, 305 surrounding targeted airport runway areas 360, 361. As shown in FIG. 3, the emitters 302, 303, 304, 305 may also be positioned at predetermined heights 309, 310 on light poles 311 or on a side of a building, for example, so that a shepherding zone 320 may be provided at a desired elevation above the runway area 350 and runway surface 351. In other embodiments, the emitters 302, 303, 304, 305 may also be positioned on or adjacent to the runway surface 351, thereby providing a shepherding zone at a lower elevation.

Referring again to FIG. 3, the emitters 302, 303, 304, 305 may be situated to create even heating zones above and below a shepherding zone 320. The even heating zones may include four deterring zones 312, 313, 314, 315 and two denial zones 316, 317. Emitters 302, 303 may respectively create deterring zones 313, 312 and denial zone 316, while emitters 304, 305 may respectively create deterring zones 315, 314 and denial zone 317. As shown in FIG. 3, two of the deterring zones 312, 313 may overlap at a denial zone 316 above the shepherding zone 320, and two deterring zones 314, 315 may overlap at a denial zone 317 below the shepherding zone 320.

It should be noted that while FIG. 3 shows even heating zones above and below the shepherding zone 320, those of skill in the art would recognize that the strongest electromagnetic radiation per unit cross-sectional area that an object within the heating zone may receive occurs when the object is very close to one of the emitters 302, 303, 304, 305. For example, as an object moves away from an emitter, the electromagnetic radiation per unit cross-sectional area received by the object decreases by the square of the distance between the object and the emitter. If an object is halfway between two emitters in a denial zone 316, then the object may still receive much less radiation than if the object were closer to one of the emitters. As an additional example, denial zone 316 shows an overlap zone for the emitters 302, 303, which will be hotter than a non-overlapping area, like deterring zone 312, but only for the same distance away from an emitter. It is understood that temperatures are highest near the emitters. Moving away from an emitter 302, temperatures may decrease and reach a minimum up to a certain distance from the emitter 302, and then increase as the object approaches another emitter 303.

In an embodiment, the denial zones 316, 317 may have higher watt energy than the deterring zones 312, 313, 314, 315, creating higher temperatures in the denial zones 316, 317 than in the deterring zones 312, 313, 314, 315, so that birds are most uncomfortable in the denial zones 316, 317 when attempting to enter the targeted areas 360, 361. Upon entering the denial zones 316, 317 from the respective deterring zones 312, 313, 314, 315, temperatures within the denial zones 316, 317 may increase. Birds in the denial zones 316, 317 may be most uncomfortable, so that they are further directed to the shepherding zone 320 and away from the targeted areas 360, 361.

Referring again to FIG. 3, deterring zones 312, 313 may provide areas above the runway area 350 and runway surface 351 that birds should not pass through or enter, while deterring zones 314, 315 may provide areas on or near the runway area 350 and runway surface 351 that are actively defended so that birds are discouraged from landing on the runway area 350 and runway surface 351. As further shown in FIG. 3, a denial zone 316 may be in the air to deter birds from entering the targeted area 360. A denial zone 316 may be an area above the shepherding zone 320 but below the top deterrent zones 312, 313. A denial zone 317 may also be located near the runway surface 351 to deter birds from landing in the targeted area 361. A denial zone 317 may be an area near the runway area 350 and runway surface 351 but above the lower deterrent zones 314, 315. The shepherding zone 320 may be located between the denial zones 316, 317 to allow the birds to escape from the deterring zones 312, 313, 314, 315 and the denial zones 316, 317 and move to an area that is safe outside of the targeted areas 360, 361.

Figure 4:
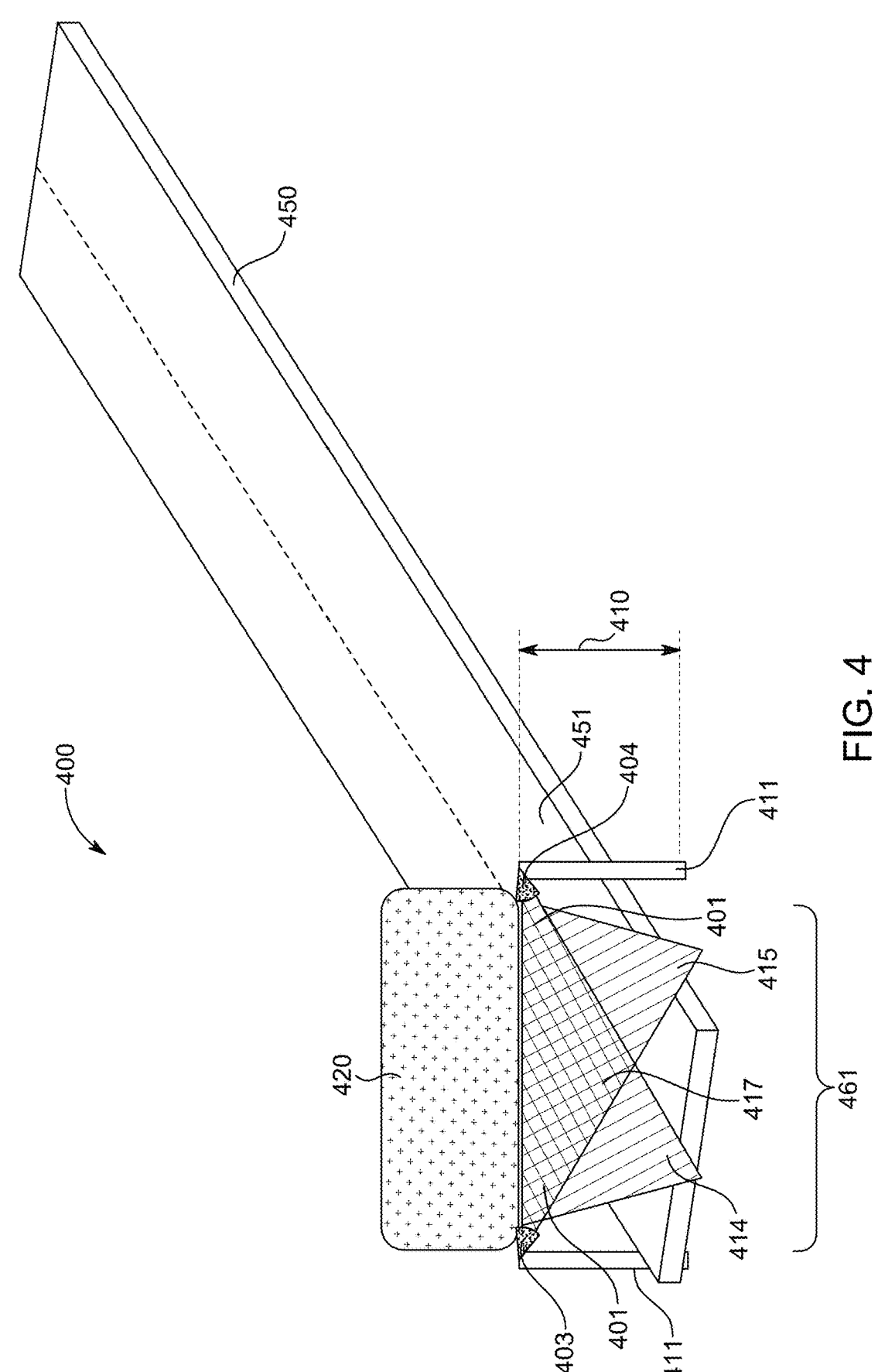
FIG. 4 shows another embodiment of a non-lethal animal shepherding active denial system using directed electromagnetic energy.

FIG. 4 represents another example embodiment of a non-lethal animal shepherding active denial system 400 using directed electromagnetic energy 401. In this embodiment there may be two emitters 403, 404, one on either side of the targeted airport runway area 461. As shown in FIG. 4, the emitters 403, 404 may be positioned at a predetermined height 410 on light poles 411 or on a side of a building, for example, so that a shepherding zone 420 may be provided at a desired elevation above the runway area 450 and runway surface 451. In other embodiments, the emitters 403, 404 may also be positioned on or adjacent to the runway surface 451, thereby providing a shepherding zone at a lower elevation.

Referring again to FIG. 4, the emitters 403, 404 may also be situated to create even heating zones adjacent to a shepherding zone 420. The even heating zones may include two deterring zones 414, 415 and one denial zone 417. Emitters 403, 404 may respectively create deterring zones 415, 414 and the denial zone 417.

It should be noted that while FIG. 4 shows even heating zones below the shepherding zone 420, those of skill in the art would recognize that the strongest electromagnetic radiation per unit cross-sectional area that an object within the heating zone may receive occurs when the object is very close to one of the emitters 403, 404. For example, as an object moves away from an emitter, the electromagnetic radiation per unit cross-sectional area received by the object decreases by the square of the distance between the object and the emitter. If an object is halfway between two emitters in a denial zone 417, then the object may still receive much less radiation than if the object were closer to one of the emitters. As an additional example, the denial zone 417 shows an overlap zone for the emitters 403, 404, which will be hotter than a non-overlapping area, like deterring zone 414, but only for the same distance away from an emitter. It is understood that temperatures are highest near the emitters. Moving away from an emitter 403, temperatures may decrease and reach a minimum up to a certain distance from the emitter 403, and then increase as the object approaches another emitter 404.

In an embodiment, the denial zone 417 may have higher watt energy than the deterring zones 414, 415, creating higher temperatures in the denial zone 417 than in the deterring zones 414, 415, so that birds are most uncomfortable in the denial zone 417 when attempting to enter the targeted areas 461. Upon entering the denial zone 417 from the respective deterring zones 414, 415, temperatures within the denial zone 417 may increase. Birds in the denial zone 417, may be most uncomfortable, so that they are further directed to the shepherding zone 420 and away from the targeted areas 461.

Referring again to FIG. 4, deterring zones 414, 415 may provide areas on or near the runway area 450 and runway surface 451 that are actively defended so that birds are discouraged from landing on the runway area 450 and runway surface 451. A denial zone 417 may be an area near the runway area 450 and runway surface 451 but above the deterrent zones 414, 415.

As further shown in FIG. 4, the deterring zones 414, 415 may overlap at a denial zone 417 below the shepherding zone 420. A denial zone 417 may be located near the runway surface 451 to deter birds from landing in the targeted area 461. The shepherding zone 420 may be located above the denial zone 417 to allow the birds to escape from the deterring zones 414, 415 and the denial zone 417 and move to an area that is safe outside of the targeted area 461.

Figure 5:
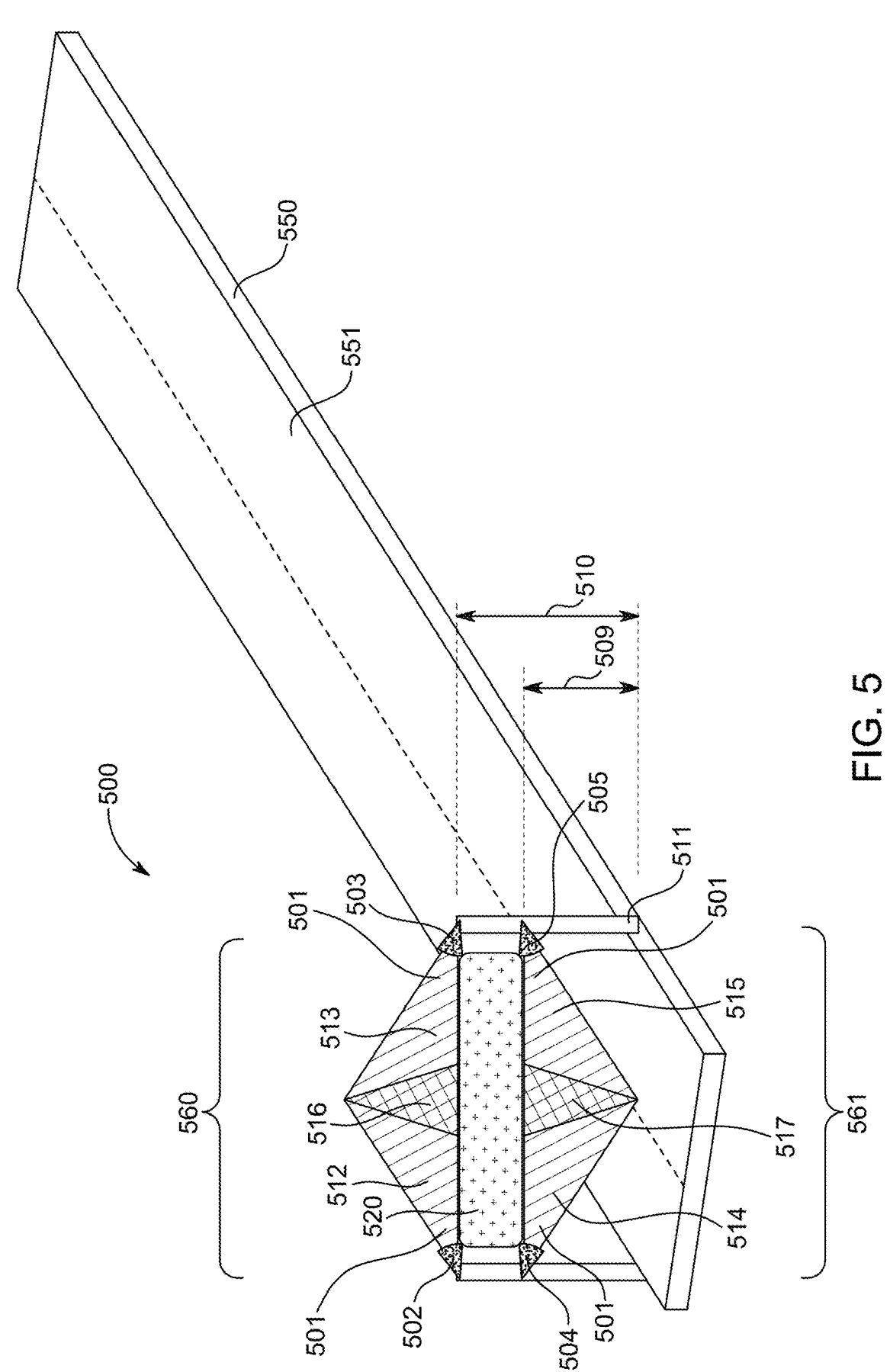
FIG. 5 shows an additional embodiment of a non-lethal animal shepherding active denial system using directed electromagnetic energy.

FIG. 5 represents an additional embodiment of a non-lethal animal shepherding active denial system 500 using directed electromagnetic energy 501. In this embodiment, there may be four emitters 502, 503, 504, 505 surrounding targeted airport runway areas 560, 561. As shown in FIG. 5, the emitters 502, 503, 504, 505 may also be positioned at predetermined heights 509, 510 on light poles 511 or on a side of a building, for example, so that a shepherding zone 520 may be provided at a desired elevation above the runway area 550 and runway surface 551. In other embodiments, the emitters 502, 503, 504, 505 may also be positioned on or adjacent to the runway surface 551, thereby providing a shepherding zone at a lower elevation.

Referring again to FIG. 5, the emitters 502, 503, 504, 505 may be situated to respectively create even heating zones above and below a shepherding zone 520. The even heating zones above the shepherding zone 520 may comprise deterring zones 512, 513. The deterring zones 512, 513 may overlap and may together comprise a denial zone 516 above the shepherding zone 520. The even heating zones below the shepherding zone 520 may comprise deterring zones 514, 515. The deterring zones 514, 515 may overlap and may together comprise a denial zone 517 below the shepherding zone 520. Emitters 502, 503 may respectively create deterring zones 512, 513 and denial zone 516, while emitters 504, 505 may respectively create deterring zones 514, 515 and denial zone 517.

It should be noted that while FIG. 5 shows even heating zones above and below the shepherding zone 520, those of skill in the art would recognize that the strongest electromagnetic radiation per unit cross-sectional area that an object within the heating zone may receive occurs when the object is very close to one of the emitters 502, 503, 504, 505. For example, as an object moves away from an emitter, the electromagnetic radiation per unit cross-sectional area received by the object decreases by the square of the distance between the object and the emitter. If an object is halfway between two emitters 502, 503 in a denial zone 516, then the object may still receive much less radiation than if the object were closer to one of the emitters. It is understood that temperatures are highest near the emitters. Moving away from an emitter 502, temperatures may decrease and reach a minimum up to a certain distance from the emitter 502, and then increase as the object approaches another emitter 503.

As further shown in FIG. 5, a denial zone 516 may be in the air to deter birds from entering the targeted area 560. A denial zone 517 may also be located near the runway surface 551 to deter birds from landing in the targeted area 561. The shepherding zone 520 may be located between the denial zones 516, 517 to allow the birds to escape from the denial zones 516, 517 and move to an area that is safe outside of the targeted areas 560, 561.

Figure 6:
FIG. 6 is a diagram that illustrates the relationship between the size of the shepherding zone and the output power of the antennae or emitters.
Figure 6:
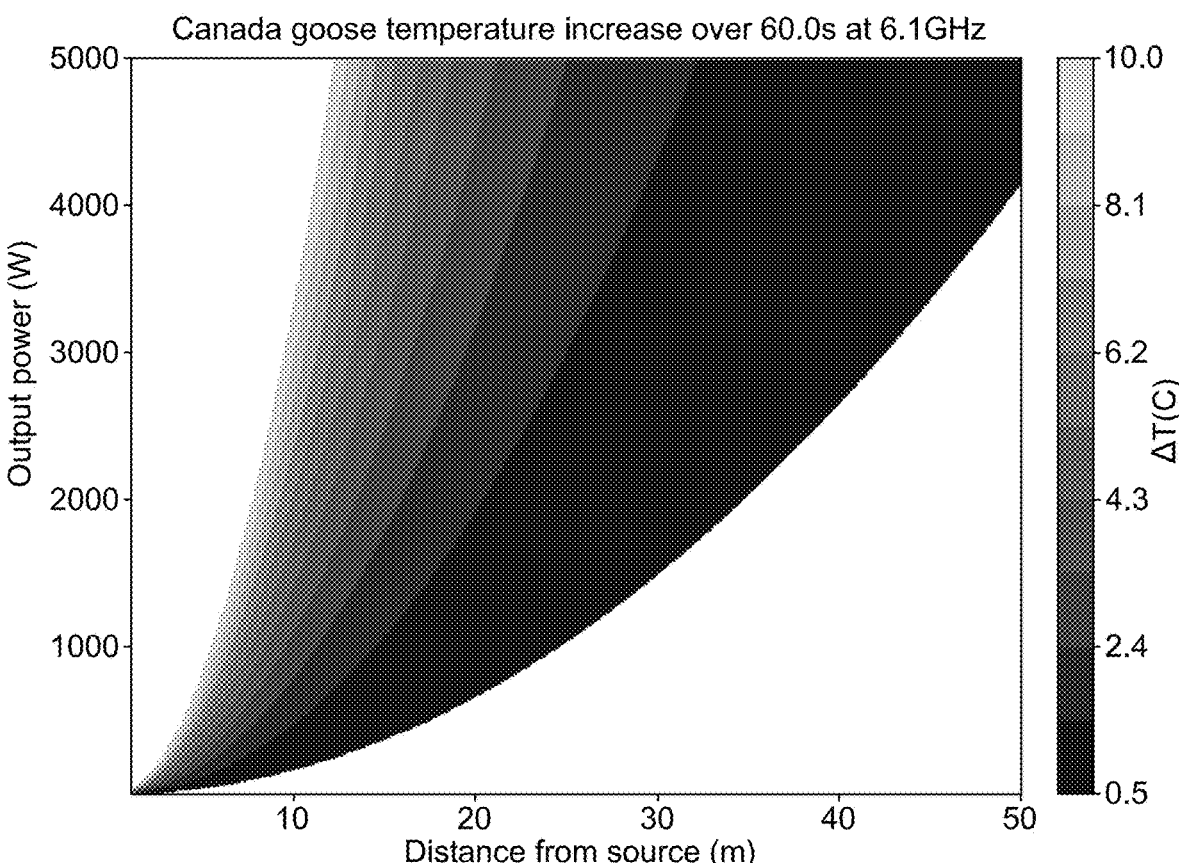

FIG. 6 provides a map diagram illustrating the relationship between the size of the shepherd zone, and the output power of the antenna. In general, as the distance between an emitter and a bird species increases, the required power level also increases to herd the birds located at a given distance. For example, as shown in the diagram of FIG. 6, a species of birds, such as Canadian geese, will start to move away from the electromagnetic energy emitted by the radiation emitter when their skin warms by 0.5C. As understood by those of skill in the art, at a temperature of 0.5C, a bird species will become mildly uncomfortable, causing the birds to move away from the emitted electromagnetic energy. As further understood by those of skill in the art, a temperature of 10C may risk injury to birds, such that it may be preferable to shepherd bird species at the requisite power levels needed to herd the bird species at minimum temperatures at a given distance.

As further shown in the diagram of FIG. 6, stronger emitters and antennae may provide wider shepherding zones in a targeted area. Likewise, stronger emitters and antennae may also provide for larger denial zones in a targeted area. As illustrated by FIG. 6, the spatial control and size of a denial zone may be related, in part, to an output power of the power source coupled to the antennae or emitters. The animal shepherding system of the herein disclosed embodiments may provide for safe shepherding of birds from a given distance, based on the determination of the required power levels to herd a particular animal from a given distance.

In further reference to FIG. 6, the requisite power levels required to herd animal species from a given distance may also be dependent upon atmospheric absorption. In particular, atmospheric absorption as a function of relative humidity and temperature may be taken into account when evaluating the required power level for herding animals from extremely long distances at very high frequency. The animal shepherding system of the herein disclosed embodiments may also provide for safe shepherding of birds from a given distance, in spite of atmospheric absorption, based on the determination of the required power levels to herd a particular animal from a given distance. Such control can be automated by the signal generator or processor.

In light of the power requirements for herding animals from long distances, as illustrated by FIG. 6, alternative embodiments of the animal shepherding system may be utilized for safe and effective animal shepherding, including an array of emitters. An emitter array or antennae array may include two or more emitters or antennas disposed together at a fixed point in a location of a targeted area. An array may provide for enhanced shaping of the electromagnetic energy emitted into a denial zone of a targeted area. For example, one emitter in an array may emit RF energy at a predetermined time or frequency level of the electromagnetic energy, while another emitter in the array may emit RF energy at another predetermined time or frequency level of the electromagnetic energy, so that the emitters in the array may operate in coordination to provide phased emissions of the energy pulses, to provide a predetermined shaping and time-varying intensity of the emission of electromagnetic energy. The applications of an emitter array or antennae array may include shepherding around airport runways, including shepherding around airport runways from longer-longer range distances, a shown in FIG. 6, between the position of the emitters and the location of the targeted area of the airport runway, for example.

In an embodiment, the antenna arrays or emitter arrays may be distinct antennas or emitters arranged sequentially in a line with spacing in between the respective antennae or emitters. In particular, the antenna arrays or emitter arrays may be operatively coupled with one transmitter or separate transmitters with modulators or phase shifters to achieve the directed shepherding of birds away from the targeted areas of a runway, for example. In another embodiment, a similar configuration of the antenna arrays or emitter arrays, with distinct antennae or emitters arranged sequentially in a line with spacing in between respective antennae or emitters, may be used for a denial zone and a deterring zone of a targeted area. In such an embodiment of an array for a denial zone and deterring zone, the application of the array may be static, without transmitters with modulators or phase shifters, as compared to an embodiment of the array used in a shepherding zone.

Referring again to FIG. 6, in an embodiment, an array of emitters may sweep through multiple electromagnetic frequencies when emitting electromagnetic energy to create a denial zone and shepherding zone. In another embodiment, an array of emitters may gradually increase power, as a phased array, when emitting electromagnetic energy to create a denial zone. In yet another embodiment, an array of emitters may provide for a time-varying intensity of a pulse of electromagnetic energy by sweeping through frequencies from either weaker intensities to stronger intensities of power generated by a power source, or from stronger intensities to weaker intensities of power generated by a power source. An emission of the electromagnetic energy by an emitter may be based upon the time-varying intensity according to the amount of power supplied from the power source for the source of the electromagnetic energy.

Referring again to FIG. 6 and as aforementioned, the spatial control of emitted electromagnetic energy relative to the size of a deterring zone and a denial zone may also be based, in part, on the type of emitters or directional antennae that are coupled to the power source. Emitters and antennae may direct electromagnetic energy in a conical shape, while directional antenna, such as a helical antenna, may produce electromagnetic energy along the axis of the helix antenna in a particular direction. Depending on the desired spatial control of the emission of electromagnetic radiation, the animal shepherding system may utilize one or both of a conical emitter and directional antenna to provide defined denial zones relative to a shepherding zone for herding animals within a targeted region.

In another embodiment, the non-lethal shepherding active denial system using directed electromagnetic energy may be adapted for controlling insects and other invasive pests, such as in residential areas, nature preserves and public parks, for example. At least one or more emitters may create at least one denial zone and one or more shepherding zones. The emitters may be situated to create even heating zones adjacent to a shepherding zone, while the denial zones may be located near the location of interest, where insect and pest control may be desirable. A shepherding zone may be located between the denial zones to allow the insects to avoid the denial zones and relocate to an area that is away from the targeted area. Such an application of the non-lethal shepherding active denial system may provide an alternative to pesticides or genetic adaptation of plants, for example. In addition, such a system may eliminate concerns regarding drift of pesticide spray. Further, the system may also be deactivated as needed to support certain species of insects, such as bees during pollination time, and monarch butterflies during migration.

In yet another embodiment, the non-lethal shepherding active denial system using directed electromagnetic energy may be adapted to support agricultural commodities, such as orange groves, with temporary heating, for example. For example, applications of dielectric heating may be effective on fruit-bearing agriculture. At least one or more emitters may be situated relative to an orange grove to create even heating zones at the targeted area of the orange grove. Additional applications of dielectric heating relative to the support of agricultural commodities may include tomatoes, oranges, and melons, for example. Such an application of the directed electromagnetic energy of the active denial system may be beneficial to protect crops and entire orchards. In light of the frequency of extreme temperature swings that accompany climate change, this additional application of the system may accommodate various agricultural demands.

Although features and elements are described above in particular combinations, each feature or element can be used alone without the other features and elements or in various combinations with or without other features and elements.

What is claimed is:

1. A system for performing animal shepherding, comprising:

a signal generator in communication with:

a power source;

an amplifier operatively coupled to the power source and configured to receive a source of an electromagnetic energy from the power source; and a plurality of emitters, each of the plurality of emitters comprising a waveguide, and being operatively coupled to the amplifier and configured to direct the source of the electromagnetic energy in a predetermined shape to at least one first zone in a targeted area, the at least one first zone disposed adjacent to a second zone in the targeted area, wherein the electromagnetic energy causes a heating of an object disposed in the at least one first zone, wherein the electromagnetic energy does not cause the heating of the object disposed in the second zone, wherein the waveguide of each of the plurality of emitters is configured to spatially control an emission of the electromagnetic energy in the at least one first zone to define a respective shape of the second zone, and wherein each of the plurality of emitters is configured to establish the at least one first zone as a denial zone and to establish the second zone as an adjacent shepherding zone that is configured as a pathway comprising the respective shape for guiding animals away from the targeted area, and adjust at least one of beam shaping or output power so as to maintain the respective shape of the adjacent shepherding zone.

2. The system of claim 1, wherein the predetermined shape is a conical shape.

3. The system of claim 1, wherein the at least one first zone is the denial zone and the second zone is the shepherding zone, the shepherding zone configured to provide the pathway for performing the animal shepherding to shepherd the animal from the denial zone into the shepherding zone, and wherein each of the plurality of emitters maintains the pathway adjacent to the denial zone.

4. The system of claim 1, wherein an emission of the electromagnetic energy by the plurality of emitters is based upon a time-varying intensity according to an amount of power from the power source for the source of the electromagnetic energy.

5. The system of claim 4, wherein the plurality of emitters comprises an array of emitters, each emitter of the array including a respective waveguide configured to direct the source of the electromagnetic energy in the predetermined shape to the first zone or the second zone in the targeted area, and wherein each of the plurality of emitters coordinates the array to maintain the respective shape of the adjacent shepherding zone.

6. The system of claim 1, wherein at least another of the plurality of emitters is operatively coupled to the amplifier and configured to direct the electromagnetic energy in the predetermined shape to at least one third zone in the targeted area, the second zone disposed between the at least one first zone and the at least one third zone in the targeted area.

7. The system of claim 6, wherein the electromagnetic energy causes a heating of an object disposed in the at least one third zone, and the at least one first zone and the at least one third zone are each a denial zone and the second zone is the shepherding zone, the shepherding zone configured to provide the pathway for performing the animal shepherding to shepherd the animal from either of the denial zones into the shepherding zone, and wherein each of the plurality of emitters maintains the shepherding zone adjacent to the denial zones.

8. An active denial system, comprising:

a signal generator in communication with:

a power source;

an amplifier operatively coupled to the power source and configured to receive a source of an electromagnetic energy from the power source; and a plurality of emitters each comprising a waveguide, each of the plurality of emitters operatively coupled to the amplifier and configured to direct the electromagnetic energy in a predetermined shape to at least one first zone in a targeted area, the at least one first zone disposed adjacent to a second zone in the targeted area, wherein the electromagnetic energy causes a heating of an object disposed in the at least one first zone, wherein the electromagnetic energy does not cause the heating of the object disposed in the second zone, wherein the waveguide of each of the plurality of emitters is configured to spatially control an emission of the electromagnetic energy in the at least one first zone to define a respective shape of the second zone, and wherein each of the plurality of emitters is configured to maintain the second zone as an adjacent shepherding zone configured as a pathway away from the targeted area, and adjusting at least one of beam shaping or output power to maintain the respective shape of the adjacent shepherding zone.

9. The system of claim 8, wherein the predetermined shape is a conical shape.

10. The system of claim 8, wherein the at least one first zone is the denial zone and the second zone is the shepherding zone, the shepherding zone configured to provide the pathway for performing the active denial to shepherd the object from the denial zone into the shepherding zone, and wherein each of the plurality of emitters maintains the pathway adjacent to the denial zone.

11. The system of claim 8, wherein an emission of the electromagnetic energy by the plurality of emitters is based upon a time-varying intensity according to an amount of power from the power source for the source of the electromagnetic energy.

12. The system of claim 11, wherein the plurality of emitters comprises an array of emitters, each emitter of the array including a respective waveguide configured to direct the source of the electromagnetic energy in the predetermined shape to the first zone or the second zone in the targeted area, and wherein each of the plurality of emitters coordinates the array to maintain the respective shape of the adjacent shepherding zone.

13. The system of claim 8, wherein at least another of the plurality of emitters is further configured to direct the electromagnetic energy in the predetermined shape to at least one third zone in the targeted area, the second zone disposed between the at least one first zone and the at least one third zone in the targeted area.

14. The system of claim 13, wherein the electromagnetic energy causes a heating of an object disposed in the at least one third zone, and the at least one first zone and the at least one third zone are each a denial zone and the second zone is the shepherding zone, the shepherding zone configured to provide the pathway for performing the active denial to shepherd the object from either of the denial zones into the shepherding zone, and wherein each of the plurality of emitters maintains the shepherding zone adjacent to the denial zones.

15. A system for heating agricultural products, comprising:

a signal generator in communication with:

a power source;

an amplifier operatively coupled to the power source and configured to receive a source of an electromagnetic energy from the power source; and a plurality of emitters each comprising a waveguide, each of the plurality of emitters operatively coupled to the amplifier and configured to direct the electromagnetic energy in a predetermined shape to at least one first zone in a targeted area, the at least one first zone disposed adjacent to a second zone in the targeted area, wherein the electromagnetic energy causes a heating of an object disposed in the at least one first zone, wherein the electromagnetic energy does not cause the heating of the object disposed in the second zone, wherein the waveguide of each of the plurality of emitters is configured to spatially control an emission of the electromagnetic energy in the at least one first zone to define a respective shape of the second zone, and wherein each of the plurality of emitters is configured to establish the at least one first zone as a heating zone for agricultural products and to establish the second zone as an adjacent non-heating zone, and adjust at least one of beam shaping or output power so as to maintain the respective shape of the adjacent non-heating zone.

16. The system of claim 15, wherein the predetermined shape is a conical shape.

17. The system of claim 15, wherein the at least one first zone is the heating zone and the second zone is the non-heating zone.

18. The system of claim 15, wherein at least another of the plurality of emitters is further configured to direct the electromagnetic energy in the predetermined shape to at least one third zone in the targeted area, the second zone disposed between the at least one first zone and the at least one third zone in the targeted area, and the electromagnetic energy causes the heating of the object disposed in the third zone.

19. The system of claim 15, wherein an emission of the electromagnetic energy by the plurality of emitters is based upon a time-varying intensity according to an amount of power from the power source for the source of the electromagnetic energy.

20. The system of claim 19, wherein the plurality of emitters comprises an array of emitters, each emitter of the array including a respective waveguide configured to direct the source of the electromagnetic energy in the predetermined shape to the first zone or the second zone in the targeted area, and wherein each of the plurality of emitters coordinates the array to maintain the respective shape of the adjacent non-heating zone.

* * * * *